No. 614,876. Patented Nov. 29, 1898.
G. H. MANSUR.
SINGLETREE.
(Application filed Aug. 19, 1898.)
(No Model.)
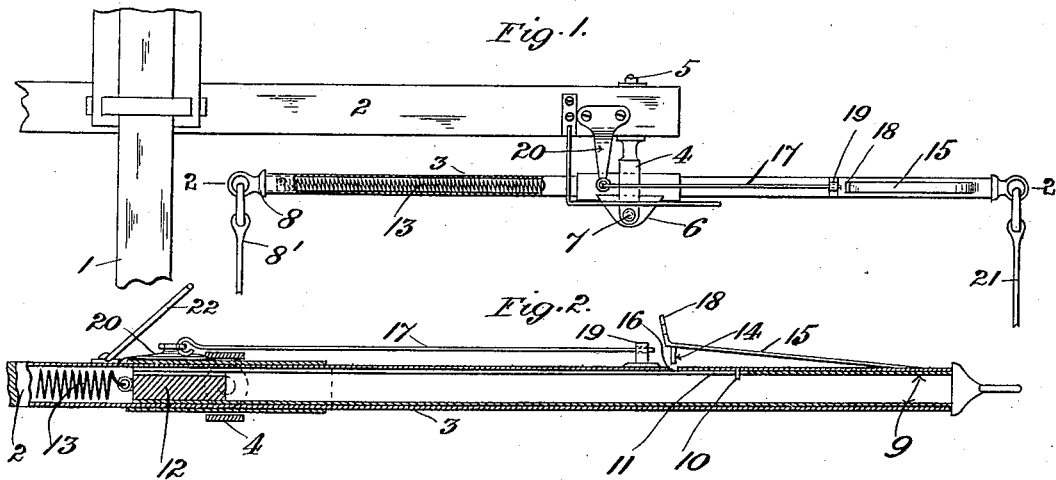
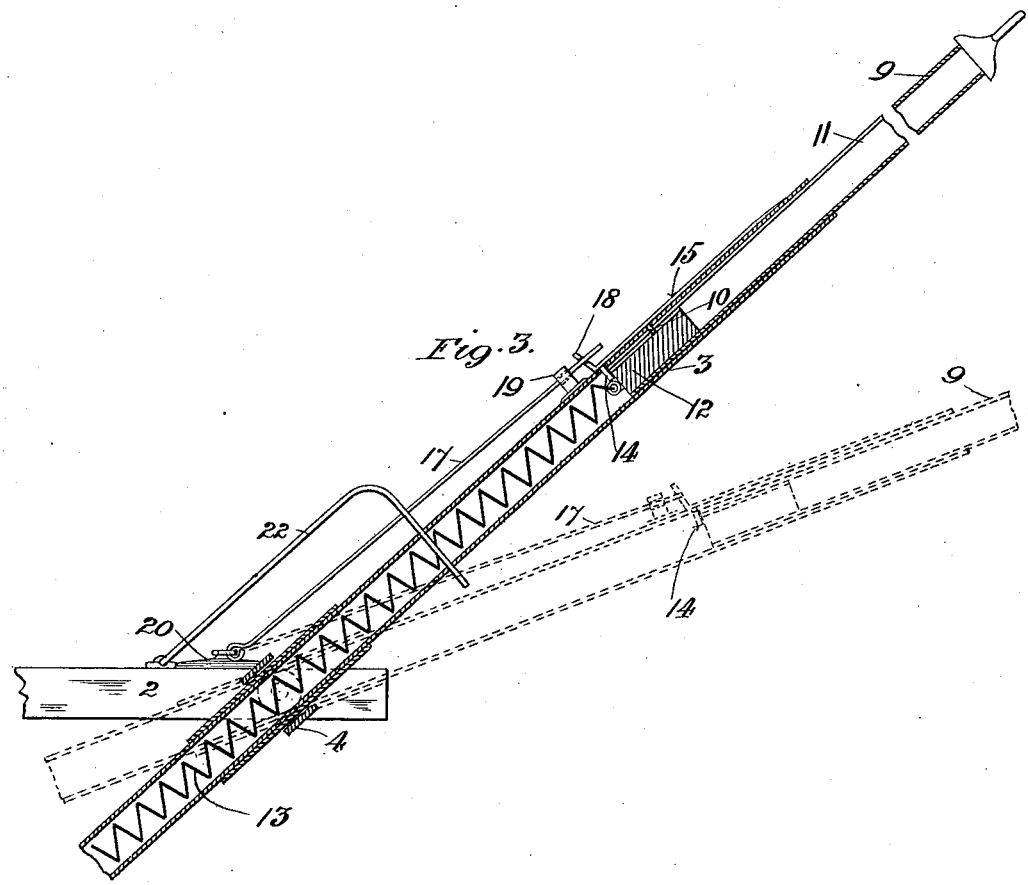
WITNESSES
Edward A. Currell
George L. Belfry.
INVENTOR,
Guy H. Mansur
by
Emil Starek, Atty

UNITED STATES PATENT OFFICE.

GUY H. MANSUR, OF ST. LOUIS, MISSOURI.

SINGLETREE.

SPECIFICATION forming part of Letters Patent No. 614,876, dated November 29, 1898.

Application filed August 19, 1898. Serial No. 689,000. (No model.)

*To all whom it may concern:*

Be it known that I, GUY H. MANSUR, a citizen of the United States, residing at St. Louis, State of Missouri, have invented certain new and useful Improvements in Singletrees, of which the following is a full, clear, and exact description, reference being had to the accompanying drawings, forming a part thereof.

My invention has relation to improvements in singletrees; and it consists in the novel arrangement and combination of parts more fully set forth in the specification and pointed out in the claims.

In the drawings, Figure 1 is a top plan view of the singletree with a part of the wall broken away, showing it attached to the doubletree. Fig. 2 is a middle vertical section taken on line 2 2 of Fig. 1, showing the parts on an enlarged scale, one end thereof being broken away; and Fig. 3 is a similar section showing the extensible portion drawn outward to its full extent and showing it in the inclined position it assumes before the draft-animal is hitched thereto and showing also in dotted position the manner in which the extended portion is gradually released from the mechanism by which it is held in such extended position.

The present invention relates to singletrees specially applicable for use by fire departments, notably in connection with the fire-engine, hook-and-ladder, or other vehicles to which the teams are to be hitched at a moment's notice.

The particular object of the present invention is to overcome the objection of the outer trace of the singletree passing over the rump of the animal as the harness is suddenly lowered and becoming entangled with other portions of the harness, an accident which is very frequent with the ordinary singletree, the prevailing length of which does not permit the animal to swerve to one side of the center of such singletree without occasioning the accident referred to. As the animals at the proper signal run in front of the singletrees, to which they are attached, it will seldom happen that they will assume a position directly in front of the centers thereof; but with my present improvement, in which the singletree is made extensible from its outer end, the trace which is secured thereto is far enough removed outwardly to permit the animal a considerable amount of lateral movement and yet retain the outer trace in such a position that as the harness is dropped over the animal the said trace will be certain to be disposed along the side of the animal, thus escaping the rump and avoiding the accident referred to. Considerable time is thereby saved in attaching the animals to the particular vehicle they are intended to draw.

In detail the invention may be described as follows:

Referring to the drawings, 1 represents the pole, and 2 the doubletree carried at the inner end thereof, (only one-half of the doubletree being shown, for a description of the device on one side will suffice to describe the opposite, the two being counterparts of each other.)

In the engine-houses of fire departments the singletrees are held in an inclined position, as shown in Fig. 3, to allow the draft-animals to run under and in front of them preparatory to being hitched thereto, the singletree being held in such a position by the harness which is secured thereto and at the same time suspended to the roof above it and assuming a horizontal position when the harness is lowered. The singletree 3 is swiveled to the doubletree by a fork 4, whose stem 5 passes through the body of the doubletree, the singletree being provided with a lug or enlargement 6, pivoted between the ends of the arms of the fork 4, sufficient space being left between the singletree and base of the fork to allow the former plenty of room for oscillation in a plane at right angles to the pivotal pin 7.

In the present invention the singletree is composed of a metal tube closed at the inner end by a plug 8, to the outer projecting end of which the inner trace 8' is secured. The opposite end of the tube is open and receives an inner sliding tubular extension member 9, prevented against rotation within the tube by the inner projecting pin 10, carried by the wall of the tube and operating in the longitudinal slit 11, formed in the peripheral walls of the extension member. The inner end of the extension member is closed by a plug 12, which when the extension member is fully inserted into the tube tends to bring the center of gravity of the singletree as near its point of suspension as possible, the plug balancing on one side of the pivoted point, and the bulk of the weight of the extension member distributed on the opposite side thereof. The inner end of the extension member is connected by a coiled spring 13 with the closed end of the tube, the tendency of the spring being to draw the member 9 into the tube. When the member 9 is fully withdrawn, (for a purpose which will presently be apparent,) as shown in Fig. 3, the same is prevented from being drawn back into the tube under the action of the spring 13 by an intercepting-pin 14, carried at the free end of a resilient or spring arm 15, whose opposite end is secured to the peripheral wall of the tube, the pin 14 being free to pass through an opening 16, formed in the wall of the tube, and engage the inner end of the extension member 9. The normal tendency of the spring-arm 15 is to retract the pin 14 from engagement with the member 9; but while the singletree is kept in the inclined position shown in Fig. 3 the free end of the arm 15, carrying said pin, is kept pressed against the wall of the tube and the pin kept in engagement with the member 9 by the free end of a controlling-rod 17, which passes through an opening of the outwardly-deflected ear 18, formed at the free end of the arm, the rod being further guided in a bearing 19, located in proximity to and in line with the opening of the ear 18. The inner end of the rod 17 is pivotally secured to an outwardly-projecting bracket 20, carried by the doubletree at a point to one side of and interior to the swivel connection between the doubletree and singletree. The bracket 20 projects forward to a point which lies in a plane passing approximately through the longitudinal axis of the singletree, the pivot of the rod 17 being substantially in said plane.

From the foregoing it is apparent that the singletree oscillates on its swivel from a different center to that about which the rod 17 oscillates. It is therefore apparent that as the extended end of the singletree is allowed to drop to a horizontal position (by letting down the harness suspended above it and which retains it in said inclined position) the free end of the controlling-rod 17 will be gradually withdrawn from the opening of the ear of the spring-arm 15, as shown by the dotted position of the parts in Fig. 3, and when the singletree has dropped to its horizontal position the rod 17 will be fully disengaged from the arm 15, allowing the free end of the latter to spring away from the wall of the tube, thus disengaging its pin 14 from the inner end of the extension member and allowing the coiled spring to retract the said member fully into the tube (see Figs. 1 and 2) and bring the outer trace 21 along the side of the horse, thus avoiding the annoyance of the said trace passing over the rump of the animal and tangling up with other parts of the harness, as already pointed out. It is of course apparent that the extension end of the singletree being the heavier it will drop to a horizontal position of its own accord the moment it is released by the lowering of the harness suspended above it.

By reason of the amount of play given to the singletree both in the horizontal and vertical planes in which it swings to prevent the inner end of the same from striking the doubletree as the outer extended end is descending I provide a curved guide-arm 22, secured at one end to the doubletree, the curved free end being adapted to bear against the outer side of the tube of the singletree during a portion of the downward sweep of the adjacent end of the latter. In other words, the object of the arm 22 is to insure the dropping of the singletree in a plane substantially parallel to the axis of the doubletree.

It is apparent, of course, that minor changes might be made in the device without departing from the spirit of my invention.

Having described my invention, what I claim is—

1. A singletree comprising a relatively stationary section, an extensible section carried thereby, means for retaining the latter section withdrawn beyond the limits of the stationary section, and means for releasing said extended section and positively retracting the same to its normal position on the stationary section, substantially as set forth.

2. A singletree comprising an outer tubular portion, an inner extensible section, and a spring for retaining the extensible section normally within the limits of the outer tube, substantially as set forth.

3. A singletree comprising a relatively stationary section, an extensible section carried thereby, means for retaining the latter section extended beyond the limits of the stationary section for one position of the singletree, and means for automatically retracting the extensible section to its normal position on the singletree for another position of the latter, substantially as set forth.

4. A singletree comprising an outer tube, means for pivoting the latter to the doubletree, an inner tube closing one end of the outer tube and adapted to be extended outwardly therefrom, a spring securing the inner end of the inner tube with the opposite end of the outer tube, a spring-arm carried by the outer tube, a pin carried by the free end of the arm and passing through the walls of the outer tube and adapted to engage the inner end of the inner tube while the free end of the spring-arm is retained against the wall of the outer tube, a controlling-rod for retaining the aforesaid pin in engagement, said rod passing through an opening formed at the free end of said arm, a bracket carried by the doubletree for pivotally securing the opposite end of the rod at a point substantially above the axis of the tube, a guide-bearing for the free end of the rod carried by the tube in proximity to the perforated end of the spring-arm, the center of oscillation of the singletree about the doubletree being eccentric, or to one side of the pivotal point of the rod, whereby for an inclined position of the singletree the rod will engage the spring-arm, and for a horizontal position is disengaged therefrom, thereby leaving the inner tube to be retracted by the spring, substantially as set forth.

5. A doubletree, a singletree pivoted thereto, and a guide-arm carried by the doubletree and adapted to bear against the singletree in front of the latter, guiding the singletree in its oscillation about the doubletree and restricting it in said oscillation in a plane, substantially parallel to the axis of the doubletree, substantially as set forth.

6. A singletree comprising an outer section, an inner section extensible outwardly therefrom, and a plug carried by or forming a part of the inner end of the inner section, the plug being normally on that side of the center of oscillation of the singletree which is opposite to that end which carries the inner section, whereby the singletree is normally balanced, substantially as set forth.

In testimony whereof I affix my signature in presence of two witnesses.

GUY H. MANSUR.

Witnesses:
  EMIL STAREK,
  GEO. L. BELFRY.